United States Patent
Cai et al.

(10) Patent No.: US 12,291,645 B1
(45) Date of Patent: May 6, 2025

(54) SPRAYING LIQUID CAR COVER FILM COMPOSITION, SPRAYING CAR COVER FILM AND PREPARATION METHOD FOR SPRAYING CAR COVER FILM

(71) Applicant: SHENZHEN FEIYANG PROTECH CORP., LTD, Guangdong (CN)

(72) Inventors: Shuisheng Cai, Guangdong (CN); Wenzhang Lv, Guangdong (CN); Laifu Yang, Guangdong (CN); Dejun Shi, Guangdong (CN); Jiang Wu, Guangdong (CN); Longhui Zhu, Guangdong (CN); Jiacong Wei, Guangdong (CN)

(73) Assignee: SHENZHEN FEIYANG PROTECH CORP., LTD, Guangdong (CN)

( * ) Notice: Subject to any disclaimer, the term of this patent is extended or adjusted under 35 U.S.C. 154(b) by 0 days.

(21) Appl. No.: 18/991,890

(22) Filed: Dec. 23, 2024

(30) Foreign Application Priority Data

Jul. 17, 2024 (CN) .......................... 202410960301.2

(51) Int. Cl.
*C09D 175/12* (2006.01)
*C09D 7/65* (2018.01)
(52) U.S. Cl.
CPC ............. *C09D 175/12* (2013.01); *C09D 7/65* (2018.01)

(58) Field of Classification Search
CPC .................................................... C09D 175/12
See application file for complete search history.

(56) References Cited

U.S. PATENT DOCUMENTS

| | | | | |
|---|---|---|---|---|
| 5,516,873 | A * | 5/1996 | Hicks | C08G 18/792 528/65 |
| 6,828,405 | B1 | 12/2004 | Cai | |
| 2005/0271881 | A1 * | 12/2005 | Hong | C08G 18/12 528/49 |
| 2013/0344253 | A1 * | 12/2013 | Abrami | C09D 175/04 427/407.1 |
| 2020/0031982 | A1 * | 1/2020 | Wen | C08G 18/8058 |

OTHER PUBLICATIONS

First Office Action received in corresponding Chinese patent application No. 202410960301.2, dated Mar. 5, 2025, 10 pages.

* cited by examiner

*Primary Examiner* — Vu A Nguyen
(74) *Attorney, Agent, or Firm* — Cooper Legal Group, LLC

(57) ABSTRACT

Disclosed is a spraying liquid car cover film composition, a spraying car cover film and a preparation method for the spraying car cover film. The spraying liquid car cover film composition at least includes an isocyanate prepolymer and an imine resin; the isocyanate prepolymer is an aliphatic isocyanate prepolymer and/or an alicyclic isocyanate elastic prepolymer; the imine resin is an aliphatic imine resin and/or an alicyclic imine resin; and the isocyanate prepolymer and/or the imine resin includes an alicyclic structure.

9 Claims, No Drawings

SPRAYING LIQUID CAR COVER FILM COMPOSITION, SPRAYING CAR COVER FILM AND PREPARATION METHOD FOR SPRAYING CAR COVER FILM

CROSS-REFERENCE TO RELATED APPLICATION

The present application claims the priority and benefit of Chinese patent application No. 202410960301.2, filed on Jul. 17, 2024. The entirety Chinese patent application No. 202410960301.2 is hereby incorporated by reference herein and made a part of this specification.

FIELD OF THE INVENTION

The present application relates to a field of spraying car cover films and, in more particular, to a spraying liquid car cover film composition, a spraying car cover film and a preparation method for the spraying car cover film.

BACKGROUND OF THE INVENTION

Car cover film is a kind of polymer film used for protecting a car body, it can be attached to a surface of the car body to form a protective layer, thereby effectively preventing the car paint from being damaged by external factors and maintaining a gloss of the car body.

A traditional car cover film generally needs to be prefabricated by a factory, which is complicated and expensive in process and requires workers of high skills. Therefore, more and more people begin to use a spraying car cover film instead of the traditional factory-prefabricated film. At present, polyurea in coatings used for spraying a car cover film has good anti-corrosion, waterproof, wear-resistant, anti-aging and other properties, and has gradually attracted people's attention.

Commonly used polyurea includes an aromatic spraying polyurea and a sterically hindered secondary amine aspartate polyurea. However, these two kinds of polyurea have the following problems: the aromatic spraying polyurea is composed of an aromatic amino component and an isocyanate which are cross-linked and cured after being sprayed. Due to a high reaction speed, the coating is cured before it wets an interior of a base material completely, a coating layer obtained therefrom has poor surface effect, low adhesion, and poor weather resistance, and cannot be directly used to a civilian car cover film. Although the sterically hindered secondary amine aspartate polyurea has a moderate curing speed and good adhesion, a coating layer obtained therefrom has poor tensile strength, tear strength and other mechanical properties, making it difficult to peel off the coating layer as a whole, and a poor peeling performance affects a convenience of replacing the car cover film.

SUMMARY

In order to solve the above technical problems, the present application provides a spraying liquid car cover film composition, a spraying car cover film and a preparation method thereof.

In a first aspect, the present application provides a spraying liquid car cover film composition, which adopts the following technical solution.

A spraying liquid car cover film composition, including component A and component B, wherein the component A includes the following raw materials in parts by weight: 10-40 parts of an isocyanate prepolymer and 1-10 parts of an isocyanate monomer; the component B includes the following raw materials in parts by weight: 5-20 parts of an imine resin and 0-20 parts of a polyaspartate resin; the isocyanate prepolymer is an aliphatic isocyanate prepolymer and/or an alicyclic isocyanate elastic prepolymer; the isocyanate monomer is an alicyclic isocyanate monomer; the imine resin is an aliphatic imine resin and/or an alicyclic imine resin; the polyaspartate resin is an aliphatic polyaspartate resin and/or an alicyclic polyaspartate resin; and at least one of the isocyanate prepolymer, the imine resin and the polyaspartate resin includes an alicyclic structure when the component A and the component B are used in combination.

Optionally, the aliphatic isocyanate elastic prepolymer is obtained by polymerization of an aliphatic isocyanate monomer with a polyol and/or a polyaspartate resin; the alicyclic isocyanate elastic prepolymer is obtained by polymerization of an alicyclic isocyanate monomer with a polyol and/or a polyaspartate resin.

Through the above technical solution the present application prepares a coating layer with high strength, high elongation rate and strong weather resistance by imine resin hydrolysis and isocyanate prepolymer curing. Moreover, an introduction of a rigid alicyclic structure further improves the strength of the coating layer, and the coating layer has good tearing ability and high tear strength. When the car cover film needs to be replaced, the coating layer can be peeled off as a whole, and a good peeling performance significantly improves the convenience of replacing the car cover film. Moreover, the present application further uses the imine resin in combination with the isocyanate prepolymer and the polyaspartate resin to adjust a drying speed of the liquid car cover film after construction. Compared with the aromatic spraying polyurea, the liquid car cover film can wet the interior of the base material completely after construction, thereby improving the adhesion between a cured coating layer and a car paint. Also, the liquid car cover film has better mechanical properties than the sterically hindered secondary amine aspartate polyurea. In addition, in the present application, the isocyanate monomer with the rigid alicyclic structure and the isocyanate prepolymer are cured in combination with the imine resin and other components in the component B, thereby further improving a mechanical strength of the coating layer and the peeling performance of the coating layer.

Optionally, the spraying liquid car cover film composition further includes the following components in parts by weight: 0-1 part of a defoamer, 0-1 part of a leveling agent, 0-1 part of an anti-sag agent, 0-3 parts of a UV absorber, 0-3 parts of a second catalyst, 0-60 parts of a second solvent, and 0-20 parts of a pigment paste.

Optionally, the second catalyst is one selected from a group consisting of: phosphoric acid, lactic acid, glacial acetic acid, citric acid, lauric acid, oxalic acid and dodecylbenzene sulfonic acid.

Optionally, the second solvent is one selected from a group consisting of: toluene, xylene, acetone, butanone, ethyl acetate, butyl acetate, ethylene glycol diacetate, propylene glycol diacetate, propylene glycol methyl ether acetate, methyl 3-methoxypropionate and ethyl 3-ethoxypropionate.

In a second aspect, the present application provides a spraying car cover film including a protective layer, wherein the protective layer is formed by the spraying liquid car cover film composition cured on an outer surface of a car paint.

Based on the above technical solution, the spraying car cover film of the present application has good adhesion to a smooth car paint and excellent mechanical strength and weather resistance, and can be peeled off as whole, thereby achieving high convenience of replacement.

In the present application, a topcoat layer is further provided on an outer surface of the protective layer, and the topcoat layer is an acrylic resin layer or a polyaspartate polyurea layer, thereby further enhancing the gloss, hardness, scratch resistance and other properties of the spraying car cover film. The acrylic resin layer is formed by curing an acrylic resin coating. The polyaspartate polyurea layer is formed by curing a polyaspartate polyurea coating. The topcoat layer formed by the above two coatings has excellent fullness, gloss, weather resistance and gloss and color retention.

In the present application, a color toning layer is further provided between the protective layer and the topcoat layer, so as to provide different colors for the spraying car cover film to meet decorative requirements. And according to actual needs, a solid-color paint layer or a more decorative metallic paint layer or pearlescent paint layer can be selected. In specific embodiments of the present application, a solid-color paint layer is used as an example to illustrate the present application. In the solid-color paint layer, the above three solid-color coatings have good weather resistance and gloss retention.

In a third aspect, the present application provides a method for preparing the spraying car cover film.

DETAILED DESCRIPTION

Embodiments of the aliphatic polyaspartate resin and the alicyclic polyaspartate resin.

In some specific embodiments of the aliphatic polyaspartate resin, the aliphatic polyaspartate resin was prepared by addition reaction of an aliphatic diamine with one of maleate and fumarate at 70-100° C. for 12-24 hours.

In some specific embodiments of the aliphatic polyaspartate resin, addition reaction of the aliphatic diamine with one of maleate and fumarate at 70-100° C. for 12-24 hours was performed firstly to obtain a product; then the product was dehydrated and condensed with at least one of a ketone compound and an aldehyde compound at 90-120° C. for 12-24 hours to obtain an aliphatic polyaspartate resin containing imino groups.

In some specific embodiments of the aliphatic polyaspartate resin, the aliphatic diamine is at least one selected from a group consisting of: pentenediamine, 2-methyl-1,5-pentenediamine, hexamethylene diamine, and trimethylhexamethylene diamine; the maleate is at least one selected from a group consisting of: dimethyl maleate, diethyl maleate, di-n-butyl maleate, and diisooctyl maleate; the fumarate is at least one selected from a group consisting of: dimethyl fumarate, diethyl fumarate, dipropyl fumarate, and dibutyl fumarate; the ketone compound is at least one selected from a group consisting of: acetone, butanone, methyl isobutyl ketone, methyl isoamyl ketone, and methyl isopropyl ketone; the aldehyde compound is at least one selected from a group consisting of: benzaldehyde, phenylacetaldehyde, n-butyraldehyde, isobutyraldehyde, isovaleraldehyde, and 2,2-dimethyl-3-lauroyloxy-propionaldehyde.

Specific embodiments of the alicyclic polyaspartate resin are the same as those of the aliphatic polyaspartate resin except that the aliphatic diamine is replaced by an alicyclic diamine. The alicyclic diamine is at least one selected from a group consisting of: 4,4'-diaminodicyclohexylmethane, 3,3'-dimethyl-4,4-diaminodicyclohexylmethane, isophorone diamine, methylcyclohexylenediamine, cyclohexylenediamine, and 1,3-cyclohexyldimethylamine.

Among these specific embodiments of the aliphatic polyaspartate resin and the alicyclic polyaspartate resin described above, the following specific embodiments are described as examples. The raw materials used in the specific embodiments of the present application are commercially available products unless otherwise specified.

Preparation Example 1.1.1

Aliphatic polyaspartate resin 1 was prepared by the following method:

Aliphatic polyaspartate resin 1 with amine equivalent of 230 was prepared by the addition reaction of 2-methyl-1,5-pentenediamine (116 kg) and diethyl maleate (344 kg) at 70° C. for 24 h.

Preparation Example 1.1.2

Alicyclic polyaspartate resin 1 was prepared by the following method:

Alicyclic polyaspartate resin 1 with amine equivalent of 291 was prepared by the addition reaction of 3,3'-dimethyl-4,4-diaminodicyclohexylmethane (238 kg) and diethyl maleate (344 kg) at 100° C. for 48 h.

Preparation Example 1.2.1

Aliphatic polyaspartate resin 2 was prepared by the following method:

Aliphatic polyaspartate resin 2 with amine equivalent of 251 was prepared by the addition reaction of trimethylhexamethylenediamine (158 kg) and diethyl fumarate (344 kg) at 70° C. for 24 h.

Preparation Example 1.2.2

Alicyclic polyaspartate resin 2 was prepared by the following method:

Alicyclic polyaspartate resin 2 with amine equivalent of 257 was prepared by the addition reaction of isophorone diamine (170 kg) and diethyl fumarate (344 kg) at 100° C. for 24 h.

Preparation Example 1.3.1

Aliphatic polyaspartate resin containing imino groups was prepared by the following method:

Addition reaction of trimethylhexamethylenediamine (158 kg) and diethyl maleate (172 kg) was performed at 70° C. for 12 h, and then 114 kg of benzaldehyde was added, a resulting solution was then heated to 120° C. for dehydration and condensation for 12 h to obtain the aliphatic polyaspartate resin containing imino groups.

Preparation Example 1.3.2

Alicyclic polyaspartate resin containing imino groups was prepared by the following method:

Addition reaction of 4,4'-diaminodicyclohexylmethane (210 kg) and diethyl maleate (172 kg) was performed at 90° C. for 24 h, and then 114 kg of benzaldehyde was added, a resulting solution was then heated to 120° C. for dehydration and condensation for 12 h to obtained the alicyclic polyaspartate resin containing imino groups.

Embodiments of the aliphatic isocyanate prepolymer and the alicyclic isocyanate prepolymer.

In some specific embodiments of the aliphatic isocyanate prepolymer, thermal-insulation polymerization reaction of an aliphatic isocyanate monomer with a polyol and/or a polyaspartate resin was performed at 60-90° C. for 5-9 h in a presence of a first catalyst or a first solvent, to obtain an aliphatic isocyanate prepolymer with a NCO content of 2-10%.

In some specific embodiments of aliphatic isocyanate prepolymers, the aliphatic isocyanate monomer is at least one selected from a group consisting of: hexamethylene-diisocyanate, hexamethylene-diisocyanate trimer, 1,5-pentyl diisocyanate, 1,5-pentyl diisocyanate trimer, and trimethyl hexadiisocyanate; the polyol is a diol, and the diol is at least one selected from a group consisting of: polyester diol, polycaprolactone diol, polycarbonate diol, polytetrahydrofuran diol, and a chain adipodiol with 1 to 18 carbon atoms and has a molecular weight of 62-3000.

In some specific embodiments of aliphatic isocyanate prepolymers, the first catalyst is an organic bismuth catalyst, purchased from Xinghai Chemical; the first solvent is at least one selected from a group consisting of: toluene, xylene, acetone, butanone, ethyl acetate, butyl acetate, ethylene glycol diacetate, propylene glycol diacetate, propylene glycol methyl ether acetate, methyl 3-methoxypropionate, and ethyl 3-ethoxypropionate.

Specific embodiments of the alicyclic isocyanate prepolymer are the same as those of the aliphatic isocyanate prepolymer except that the aliphatic isocyanate monomer is replaced by an alicyclic isocyanate monomer. The alicyclic isocyanate monomer is at least one selected from a group consisting of: isophorone diisocyanate, isophorone diisocyanate trimer, dicyclohexylmethane diisocyanate, and cyclohexane dimethylene diisocyanate.

Among these specific embodiments of the aliphatic isocyanate prepolymer and the alicyclic isocyanate prepolymer described above, the following specific embodiments are described as examples. The raw materials used in the specific embodiments of the present application are commercially available products unless otherwise specified.

Preparation Example 2.1.1

Aliphatic isocyanate prepolymer 1 was prepared by the following method:
100 kg of hexamethylene-diisocyanate with a NCO content of 49.5% was heated to 70° C., then 302 kg of polycaprolactone diol with an average molecular weight of 1000 was added to obtain a mixture. Thermal-insulation reaction of the mixture was performed at 70° C. for 8 h to obtain the aliphatic isocyanate prepolymer 1 with a NCO content of 6.0%.

Preparation Example 2.1.2

Alicyclic isocyanate prepolymer 1 was prepared by the following method:
100 kg of isophorone diisocyanate with a NCO content of 37.5% was heated to 70° C., fthen 219 kg of polycaprolactone diol with an average molecular weight of 1000 was added to obtain a mixture. Thermal-insulation reaction of the mixture was performed at 70° C. for 8 h to obtain the alicyclic isocyanate prepolymer 1 with a NCO content of 6.0%.

Preparation Example 2.2.1

Aliphatic isocyanate prepolymer 2 was prepared by the following method:
0.01 kg of the organic bismuth catalyst was added to 100 kg of 1,5-pentyl diisocyanate with a NCO content of 54.5% and heated to 60° C., then 290 kg of polytetrahydrofuran diol with an average molecular weight of 2000 and 100 kg of polycarbonate diol with an average molecular weight of 650 were added to obtain a mixture. Thermal-insulation reaction of the mixture was performed at 60° C. for 5 h to obtain the aliphatic isocyanate prepolymer 2 with a NCO content of 6.0%.

Preparation Example 2.2.2

Alicyclic isocyanate prepolymer 2 was prepared by the following method:
0.01 kg of the organic bismuth catalyst was added to 100 kg of dicyclohexylmethane diisocyanate with a NCO content of 32% and heated to 60° C., then 290 kg of polytetrahydrofuran diol with an average molecular weight of 2000 and 100 kg of polycarbonate diol with an average molecular weight of 650 were added to obtain a mixture. Thermal-insulation reaction of the mixture was performed at 60° C. for 5 h to obtain the alicyclic isocyanate prepolymer 2 with a NCO content of 6.0%.

Preparation Example 2.3.1

Aliphatic isocyanate prepolymer 3 was prepared by the following method:
40 kg of xylene and 30 kg of butyl acetate were added to 138 kg of trimethyl hexadiisocyanate with a NCO content of 40% and heated to 80° C., then 290 kg of polycaprolactone diol with an average molecular weight of 2000 was added to obtain a mixture. Thermal-insulation reaction of the mixture was performed at 80° C. for 5 h. Then, 20 kg of propanetriol with an average molecular weight of 92 was added for thermal-insulation reaction for 1 h to obtain the aliphatic isocyanate prepolymer 3 with a NCO content of 3.0%.

Preparation Example 2.3.2

Alicyclic isocyanate prepolymer 3 was prepared by the following method:
68.5 kg of xylene and 51.5 kg of butyl acetate were added to 193 kg of dicyclohexylmethane diisocyanate with a NCO content of 32% and heated to 80° C., then 290 kg of polycaprolactone diol with an average molecular weight of 2000 was added to obtain a mixture. Thermal-insulation reaction of the mixture was performed at 80° C. for 5 h. Then, 180 kg of the alicyclic polyaspartate resin 1 with an average molecular weight of 582, prepared in Preparation Example 1.1.2, was added for thermal-insulation reaction for 1 h to obtain the alicyclic isocyanate prepolymer 3 with a NCO content of 3.0%.

Preparation Example 2.4.1

Aliphatic isocyanate prepolymer 4 was prepared by the following method:
0.01 kg of the organic bismuth catalyst was added to 100 kg of 1,5-pentyl diisocyanate with a NCO content of 54.5% and heated to 75° C., then 950 kg of polyester diol with an average molecular weight of 3000 was added to obtain a mixture. Thermal-insulation reaction of the mixture was performed at 75° C. for 8 h. Then, 500 kg of 1,5-pentyl diisocyanate trimer with a NCO content of 25% was added for thermal-insulation reaction for 1 h to obtain the aliphatic isocyanate prepolymer 4 with a NCO content of 9.86%.

Preparation Example 2.4.2

Alicyclic isocyanate prepolymer 4 was prepared by the following method:
0.01 kg of the organic bismuth catalyst was added to 130 kg of cyclohexane dimethylene diisocyanate with a NCO content of 43% and heated to 75° C., then 950 kg of polyester diol with an average molecular weight of 3000 was added to obtain a mixture. Thermal-insulation reaction of the mixture was performed at 75° C. for 8 h. Then, 330 kg of dicyclohexylmethane diisocyanate with a NCO content of 32% and 50 kg of isophorone diisocyanate trimer with a NCO content of 17.5% were added for thermal-insulation reaction for 1 h to obtain the alicyclic isocyanate prepolymer 4 with a NCO content of 9.86%.

Embodiments of the aliphatic imine resin and the alicyclic imine resin.

In some specific embodiments of the aliphatic imine resin, an aliphatic diamine was dehydrated and condensed with at least one of the ketone compound and the aldehyde compound at 90-120° C. for 12-24 hours to obtain the aliphatic imine resin.

In some specific embodiments of the aliphatic imine resin, the aliphatic diamine is at least one selected from a group consisting of: pentenediamine, 2-methyl-1,5-pentenediamine, hexamethylene diamine, and trimethylhexamethylene diamine.

Specific embodiments of the alicyclic imine resin are the same as those of the aliphatic imine resin except that the aliphatic diamine is replaced by an alicyclic diamine. The alicyclic diamine is at least one selected from a group consisting of: 4,4'-diaminodicyclohexylmethane, 3,3'-dimethyl-4,4-diaminodicyclohexylmethane, isophorone diamine, methylcyclohexylenediamine, cyclohexylenediamine, and 1,3-cyclohexyldimethylamine.

Among these specific embodiments of the aliphatic imine resin and the alicyclic imine resin described above, the following specific embodiments are described as examples. The raw materials used in the specific embodiments of the present application are commercially available products unless otherwise specified.

Preparation Example 3.1.1

Aliphatic imine resin 1 was prepared by the following method:
116 kg of hexamethylene diamine and 144 kg of isobutyral were mixed and heated to 90° C. for dehydration and condensation for 12 h to obtain the aliphatic imine resin 1.

Preparation Example 3.1.2

Alicyclic imine resin 1 was prepared by the following method:
170 kg of isophorone diamine, 128 kg of methylcyclohexanediamine and 577 kg of butanone were mixed and heated to 90° C. for dehydration and condensation for 12 h to obtain the alicyclic imine resin 1.

Preparation Example 3.2.1

Aliphatic imine resin 2 was prepared by the following method:
102 kg of pentenediamine and 220 kg of benzaldehyde were mixed and heated to 120° C. for dehydration and condensation for 12 h to obtain the aliphatic imine resin 2.

Preparation Example 3.2.2

Alicyclic imine resin 2 was prepared by the following method:
210 kg of 4,4'-diaminodicyclohexylmethane, 53 kg of isobutyraldehyde and 220 kg of methyl isobutyl ketone were mixed and heated to 120° C. for dehydration and condensation for 12 h to obtain the alicyclic imine resin 2.

Preparation Example 3.3.1

Aliphatic imine resin 3 was prepared by the following method:
116 kg of 2-methyl-1,5-pentenediamine, 108 kg of butanone and 150 kg of methyl isobutyl ketone were mixed and heated to 90° C. for dehydration and condensation for 24 h to obtain the aliphatic imine resin 3.

Preparation Example 3.3.2

Alicyclic imine resin 3 was prepared by the following method:
238 kg of 3,3'-dimethyl-4,4-diaminodicyclohexylmethane, 108 kg of butanone and 150 kg of methyl isobutyl ketone were mixed and heated to 110° C. for dehydration and condensation for 24 h to obtain the alicyclic imine resin 3.

Embodiments of the pigment paste.

In some specific embodiments of the pigment paste, 0-60 parts of the polyaspartate resin, 0-60 parts of the imine resin, 0.1-1 part of an anti-settling agent, 1-10 parts of a dispersant, 10-70 parts of a pigment, and 0-20 parts of a third solvent are mixed and then dispersed at a high speed of 1000-1500 r/min for 30-40 min and milled to a fineness of less than 20 m to obtain the pigment paste.

In some specific embodiments of the pigment paste, the anti-settling agent is BYK163; the dispersant is fumed silica R972 or polyamide wax 6900-20X; the pigment is at least one selected from a group consisting of: inorganic pigments, pearlescent pigments, and organic pigments, wherein the inorganic pigments include but are not limited to diamond titanium dioxide, carbon black, iron oxide red, and iron oxide yellow; the third solvent is at least one selected from a group consisting of: toluene, xylene, acetone, butanone, ethyl acetate, butyl acetate, ethylene glycol diacetate, propylene glycol diacetate, propylene glycol methyl ether acetate, methyl 3-methoxypropionate, and ethyl 3-ethoxypropionate.

Among these specific embodiments of the pigment paste described above, the following specific embodiments are described as examples. The raw materials used in the specific embodiments of the present application are commercially available products unless otherwise specified.

Preparation Example 4.1

Pigment paste 1 was prepared by the following method:
35 kg of alicyclic polyaspartate resin 1 prepared in Preparation Example 1.1.2, 15 kg of alicyclic imide resin 1 prepared in Preparation Example 3.1.2, 0.2 kg of the anti-settling agent (BYK163), 1 kg of the dispersant (fumed silica R972), 8 kg of iron oxide red, 25 kg of pearl-white, 10 kg of butyl acetate, and 5.8 kg of propylene glycol methyl ether acetate were dispersed at a high speed of 1000 r/min for 40 min, and then milled to a fineness of less than 20 m to obtain the pigment paste 1.

Preparation Example 4.2

Pigment paste 2 was prepared by the following method:
60 kg of alicyclic polyaspartate resin 1 prepared in Preparation Example 1.1.2, 0.1 kg of the anti-settling agent (BYK163), 5 kg of the dispersant (polyamide wax 6900-20X), 8 kg of iron oxide red, 11.1 kg of pearl-white, 10 kg of butyl acetate, and 5.8 kg of propylene glycol methyl ether acetate were dispersed at a high speed of 1500 r/min for 30 min, and then milled to a fineness of less than 20 m to obtain the pigment paste 2.

Preparation Example 4.3

Pigment paste 3 was prepared by the following method:
25 kg of alicyclic imine resin 1 prepared in Preparation Example 3.1.2, 1 kg of the anti-settling agent (BYK163), 1 kg of the dispersant (fumed silica R972), 30 kg of iron oxide red, 40 kg of pearl-white, and 3 kg of ethylene glycol diacetate were dispersed at a high speed of 1300 r/min for 35 min, and then milled to a fineness of less than 20 m to obtain the pigment paste 3.

Embodiments of the Spraying Car Cover Film

Example 1.1

A preparation method for the spraying car cover film, including the following steps:
S1, 40 kg of alicylic isocyanate prepolymer 1 prepared in Preparation Example 2.1.2, 25 kg of the second solvent (10 kg of butyl acetate, and 15 kg of propylene glycol methyl ether acetate), 1 kg of a defoamer (BYK1790), 1 kg of a leveling agent (EFKA3600) and 3 kg of a UV absorber (UV1130) were dispersed at a speed of 1000 r/min for 40 min to obtain component A; 20 kg of aliphatic imide resin 1 prepared in Preparation Example 3.1.1, 20 kg of aliphatic polyaspartate resin 1 prepared in Preparation Example 1.1.1, and 35 kg of the second solvent (20 kg of xylene, and 15 kg of propylene glycol methyl ether acetate) were dispersed at a speed of 1000 r/min for 40 min to obtain component B; and
S2, the component A and the component B were mixed at a weight ratio of 4.5:1 to obtain a mixture and the mixture was sprayed on an outer surface of a car paint to form a protective layer with a thickness of 100 m after the mixture was cured, thus the spraying car cover film was obtained.

Example 1.2

A preparation method for the spraying car cover film, including the following steps:
S1, 40 kg of alicylic isocyanate prepolymer 2 prepared in Preparation Example 2.2.2, 25 kg of the second solvent (10 kg of butyl acetate, and 15 kg of propylene glycol methyl ether acetate), 1 kg of a defoamer (BYK1790), 1 kg of a leveling agent (EFKA3600) and 3 kg of a UV absorber (UV1130) were dispersed at a speed of 1500 r/min for 30 min to obtain component A; 20 kg of aliphatic imide resin 2 prepared in Preparation Example 3.2.1, 20 kg of aliphatic polyaspartate resin 2 prepared in Preparation Example 1.2.1, and 35 kg of the second solvent (20 kg of xylene, and 15 kg of propylene glycol methyl ether acetate) were dispersed at a speed of 1500 r/min for 30 min to obtain component B; and
S2, the component A and the component B were mixed at a weight ratio of 4:1 to obtain a mixture and the mixture was sprayed on an outer surface of a car paint to form a protective layer with a thickness of 100 m after the mixture was cured, thus the spraying car cover film was obtained.

Example 1.3

A preparation method for a spraying car cover film, including the following steps:
S1, 40 kg of alicylic isocyanate prepolymer 3 prepared in Preparation Example 2.3.2, 25 kg of the second solvent (10 kg of butyl acetate, and 15 kg of propylene glycol methyl ether acetate), 1 kg of a defoamer (BYK1790), 1 kg of a leveling agent (EFKA3600) and 3 kg of a UV absorber (UV1130) were dispersed at a speed of 1000 r/min for 40 min to obtain component A; 20 kg of aliphatic imide resin 2 prepared in Preparation Example 3.2.1, 20 kg of aliphatic imino polyaspartate resin prepared in Preparation Example 1.3.1, and 35 kg of the second solvent (20 kg of xylene, and 15 kg of propylene glycol methyl ether acetate) were dispersed at a speed of 1000 r/min for 40 min to obtain component B; and
S2, the component A and the component B were mixed at a weight ratio of 10:1 to obtain a mixture and the mixture was sprayed on an outer surface of a car paint to form a protective layer with a thickness of 100 m after the mixture was cured, thus the spraying car cover film was obtained.

Example 1.4

A preparation method for a spraying car cover film, including the following steps:
S1, alicyclic isocyanate prepolymer 4 prepared in Preparation Example 2.4.2 was used as component A; aliphatic imide resin 3 prepared in Preparation Example 3.3.1 was used as component B;
S2, the component A and the component B were mixed at a weight ratio of 3.5:1 to obtain a mixture and the mixture was sprayed on an outer surface of a car paint to form a protective layer with a thickness of 100 m after the mixture was cured, thus the spraying car cover film was obtained.

Example 2.1

A preparation method for a spraying car cover film, including the following steps:
S1, 40 kg of aliphatic isocyanate prepolymer 1 prepared in Preparation Example 2.1.1, 25 kg of the second solvent (10 kg of butyl acetate, and 15 kg of propylene glycol methyl ether acetate), 1 kg of a defoamer (BYK1790), 1 kg of a leveling agent (EFKA3600) and 3 kg of a UV absorber (UV1130) were dispersed at a speed of 1000 r/min for 40 min to obtain component A; 20 kg of alicyclic imide resin 1 prepared in Preparation Example 3.1.2, 20 kg of aliphatic polyaspartate resin 1 prepared in Preparation Example 1.1.1, and 35 kg of the second solvent (20 kg of xylene, and 15 kg of propylene glycol methyl ether acetate) were dispersed at a speed of 1000 r/min for 40 min to obtain component B; and S2, the component A and the component B were mixed at a weight ratio of 4.2:1 to obtain a mixture and the mixture was sprayed on an outer surface of a car paint to form a protective layer with a thickness of 100 m after the mixture was cured, thus the spraying car cover film was obtained.

Example 2.2

A preparation method for a spraying car cover film, including the following steps:
S1, 40 kg of aliphatic isocyanate prepolymer 2 prepared in Preparation Example 2.2.1, 25 kg of the second solvent (10 kg of butyl acetate, and 15 kg of propylene glycol methyl ether acetate), 1 kg of a defoamer (BYK1790), 1 kg of a leveling agent (EFKA3600) and 3 kg of a UV absorber (UV1130) were dispersed at a speed of 1500 r/min for 30 min to obtain component A; 20 kg of alicyclic imide resin 2 prepared in Preparation Example 3.2.2, 20 kg of aliphatic polyaspartate resin 2 prepared in Preparation Example 1.2.1, and 35 kg of the second solvent (20 kg of xylene, and 15 kg of propylene glycol methyl ether acetate) were dispersed at a speed of 1500 r/min for 40 min to obtain component B; and S2, the component A and the component B were mixed at a weight ratio of 3.2:1 to obtain a mixture and the mixture was sprayed on an outer surface of a car paint to form a protective layer with a thickness of 100 m after the mixture was cured, thus the spraying car cover film was obtained.

Example 2.3

A preparation method for a spraying car cover film, including the following steps:
S1, 40 kg of aliphatic isocyanate prepolymer 3 prepared in Preparation Example 2.3.1, 25 kg of the second solvent (10 kg of butyl acetate, and 15 kg of propylene glycol methyl ether acetate), 1 kg of a defoamer (BYK1790), 1 kg of a leveling agent (EFKA3600) and 3 kg of a UV absorber (UV1130) were dispersed at a speed of 1000 r/min for 40 min to obtain component A; 20 kg of alicylic imide resin 2 prepared in Preparation Example 3.2.2, 20 kg of aliphatic imino polyaspartate resin prepared in Preparation Example 1.3.1, and 35 kg of the second solvent (20 kg of xylene, and 15 kg of propylene glycol methyl ether acetate) were dispersed at a speed of 1000 r/min for 40 min to obtain component B; and S2, the component A and the component B were mixed at a weight ratio of 7:1 to obtain a mixture and the mixture was sprayed on an outer surface of a car paint to form a protective layer with a thickness of 100 m after the mixture was cured, thus the spraying car cover film was obtained.

Example 2.4

A preparation method for a spraying car cover film, including the following steps:
S1, 10 kg of aliphatic isocyanate prepolymer 4 prepared in Preparation Example 2.4.1, 5 kg of the second solvent (xylene), 0.1 kg of a defoamer (BYK1790), 0.1 kg of a leveling agent (EFKA3600) and 0.5 kg of a UV absorber (UV1130) at 1000 r/min for 40 min to obtain component A; dispersing 5 kg of alicyclic imide resin 3 prepared in Preparation Example 3.3.2, 13 kg of a second solvent (propylene glycol methyl ether acetate), 0.1 kg of a defoamer (BYK1790), 0.1 kg of a leveling agent (EFKA3600) and 0.5 kg of a UV absorber (UV1130) at 1000 r/min for 40 min to obtain component B; and S2, the component A and the component B were mixed at a weight ratio of 1:1 to obtain a mixture and the mixture was sprayed on an outer surface of a car paint to form a protective layer with a thickness of 100 m after the mixture was cured, thus the spraying car cover film was obtained.

Example 3.1

Provided was a preparation method for a spraying car cover film, including the following steps:
S1, dispersing 40 kg of aliphatic isocyanate prepolymer 1 prepared in Preparation Example 2.1.1, 25 kg of a second solvent (10 kg of butyl acetate, 15 kg of propylene glycol methyl ether acetate), 1 kg of a defoamer (BYK1790), 1 kg of a leveling agent (EFKA3600) and 3 kg of a UV absorber (UV1130) were dispersed at a speed of 1000 r/min for 40 min to obtain component A; 20 kg of aliphatic imide resin 1 prepared in Preparation Example 3.1.1, 20 kg of alicyclic polyaspartate resin 1 prepared in Preparation Example 1.1.2, and 35 kg of the second solvent (20 kg of xylene, and 15 kg of propylene glycol methyl ether acetate) were dispersed at a speed of 1500 r/min for 40 min to obtain component B; and S2, the component A and the component B were mixed at a weight ratio of 4.2:1 to obtain a mixture and the mixture was sprayed on an outer surface of a car paint to form a protective layer with a thickness of 100 m after the mixture was cured, thus the spraying car cover film was obtained.

Example 3.2

A preparation method for a spraying car cover film, including the following steps:
S1, 40 kg of aliphatic isocyanate prepolymer 2 prepared in Preparation Example 2.2.1, 25 kg of the second solvent (10 kg of butyl acetate, and 15 kg of propylene glycol methyl ether acetate), 1 kg of a defoamer (BYK1790), 1 kg of a leveling agent (EFKA3600) and 3 kg of a UV absorber (UV1130) were dispersed at a speed of 1000 r/min for 40 min to obtain component A; 20 kg of aliphatic imide resin 2 prepared in Preparation Example 3.2.1, 20 kg of alicyclic polyaspartate resin 2 prepared in Preparation Example 1.2.2, and 35 kg of the second solvent (20 kg of xylene, and 15 kg of propylene glycol methyl ether acetate) were dispersed at a speed of 1500 r/min for 40 min to obtain component B of a polyurea coating; and S2, the component A and the component B were mixed at a weight ratio of 4:1 to obtain a mixture and the mixture was sprayed on an outer surface of a car paint to form a protective layer with a thickness of 100 m after the mixture was cured, thus the spraying car cover film was obtained.

Example 3.3

A preparation method for a spraying car cover film, including the following steps:

S1, 40 kg of aliphatic isocyanate prepolymer 3 prepared in Preparation Example 2.3.1, 25 kg of the second solvent (10 kg of butyl acetate, and 15 kg of 1-(3-methoxy)propyl acetate), 1 kg of a defoamer (BYK1790), 1 kg of a leveling agent (EFKA3600) and 3 kg of a UV absorber (UV1130) were dispersed at a speed of 1000 r/min for 40 min to obtain component A; 20 kg of aliphatic imide resin 3 prepared in Preparation Example 3.3.1, 20 kg of alicylic imino polyaspartate resin prepared in Preparation Example 1.3.2, and 35 kg of the second solvent (20 kg of xylene, and 15 kg of propylene glycol methyl ether acetate) were dispersed at a speed of 1500 r/min for 40 min to obtain component B; and S2, the component A and the component B were mixed at a weight ratio of 10:1 to obtain a mixture and the mixture was sprayed on an outer surface of a car paint to form a protective layer with a thickness of 100 m after the mixture was cured, thus the spraying car cover film was obtained.

Example 4

A preparation method for a spraying car cover film in this example is the same as that in Example 1.1 except that the aliphatic imide resin 1 prepared in Preparation Example 3.1.1 was replaced by the alicylic imide resin 2 prepared in Preparation Example 3.2.2 and the weight ratio of the component A to the component B was 3.3:1.

Example 5.1

A preparation method for a spraying car cover film in this example is the same as that in Example 4 except that the aliphatic polyaspartate resin 1 prepared in Preparation Example 1.1.1 was replaced by alicylic polyaspartate resin 1 prepared in Preparation Example 1.1.2, and the weight ratio of the component A to the component B was 3:1.

Example 5.2

A preparation method for a spraying car cover film in this example is the same as that in Example 5.1 except that in step S2, 3 kg of a second catalyst (phosphoric acid) was further added.

Example 6.1

A preparation method for a spraying car cover film in this example is the same as that in Example 2.1 except that in step S1, 1 kg of 1,5-pentyl diisocyanate trimer was further added to the component A and the weight ratio of the component A to the component B was 3.5:1.

Example 6.2

A preparation method for a spraying car cover film in this example is the same as that in Example 2.1 except that in step S1, 10 kg of cyclohexane dimethylene diisocyanate was further added to the component A and the weight ratio of the component A to the component B was 1.5:1.

Examples 7.1-7.4

A preparation method for a spraying car cover film in this example is the same as that in Example 2.1 except that in step S1, 20 kg of pigment paste was further added to the component B, wherein Example 7.1 adopted an ordinary pigment paste purchased from Axalta, model: SpiesHecker; Examples 7.2-7.4 respectively adopted pigment pastes prepared in Preparation Examples 4.1-4.3.

Example 8.1

A preparation method for a spraying car cover film in this example is the same as that in Example 5.1 except that a polyaspartate polyurea coating was further sprayed on an outer surface of the protective layer, and a topcoat layer with a thickness of 40 m was formed after the polyaspartate polyurea coating was cured. The polyaspartate polyurea coating was a self-made product and the specific raw materials of the polyaspartate polyurea coating were as follows: the component A included the alicyclic polyaspartate resin prepared in Preparation Example 1.1.2, 40 kg of the second solvent (20 kg of butyl acetate, and 20 kg of propylene glycol methyl ether acetate), 0.1 kg of a defoamer (BYK1790). 0.1 kg of a leveling agent (EFKA3600) and 0.3 kg of a UV absorber (UV1130); the component B included 20 kg of HDI trimer and 20 kg of the second solvent (10 kg of xylene, and 10 kg of propylene glycol methyl ether acetate).

Example 8.2

A preparation method for a spraying car cover film in this example is the same as that in Example 5.1 except that a polyaspartate polyurea coating was further sprayed on an outer surface of the protective layer, and a topcoat layer with a thickness of 100 m was formed after the polyaspartate polyurea coating was cured. The polyaspartate polyurea coating was a self-made product and the specific raw materials of the polyaspartate polyurea coating were as follows: the component A included the alicyclic polyaspartate resin prepared in Preparation Example 1.1.2, 40 kg of the second solvent (20 kg of butyl acetate, and 20 kg of propylene glycol methyl ether acetate), 0.1 kg of a defoamer (BYK1790). 0.1 kg of a leveling agent (EFKA3600) and 0.3 kg of a UV absorber (UV1130); the component B included 20 kg of HDI trimer and 20 kg of the second solvent (10 kg of xylene, and 10 kg of propylene glycol methyl ether acetate).

Example 9

A preparation method for a spraying car cover film in this example is the same as that in Example 8.1 except that a polyaspartate-based solid-color coating was sprayed on an outer surface of the protective layer firstly, followed by a spraying of the polyaspartate polyurea coating, wherein the pigment paste prepared in Preparation Example 4.1 was used as the polyaspartate-based solid-color coating, and a color toning layer with a thickness of 20 m was formed after the polyaspartate-based solid-color coating was cured.

Comparative Example 1

This comparative example differs from Example 1.1 in that the alicyclic isocyanate prepolymer 1 prepared in Preparation Example 2.1.2 in the component A was replaced by the aliphatic isocyanate prepolymer 1 prepared in Preparation Example 2.1.1, and the aliphatic imide resin and aliphatic polyaspartate resin in the component B were replaced by diphenylmethane diamine (MDA). The remaining process followed the same method as in Example 1.1 to prepare a spraying aromatic polyurea, and the spraying aromatic polyurea was sprayed on an outer surface of a car paint to form a protective layer with a thickness of 100 m after the spraying aromatic polyurea was cured.

Comparative Example 2

This comparative example differs from Example 1.1 in that the alicyclic isocyanate prepolymer 1 prepared in Preparation Example 2.1.2 in the component A was replaced by the aliphatic isocyanate prepolymer 1 prepared in Preparation Example 2.1.1, and the aliphatic imide resin in the component B was removed. The remaining process followed the same method as in Example 1.1 to prepare a sterically hindered secondary amine aspartate polyurea, and the sterically hindered secondary amine aspartate polyurea was sprayed on an outer surface of a car paint to form a protective layer with a thickness of 100 m after the sterically hindered secondary amine aspartate polyurea was cured.

Comparative Example 3

This comparative example is the same as Example 1.1 except that the alicyclic isocyanate prepolymer 1 prepared in Preparation Example 2.1.2 in step S1 was replaced by the aliphatic isocyanate prepolymer 1 prepared in Preparation Example 2.1.1.

Performance Test

The spraying car cover films prepared in Examples 1-9 and Comparative Examples 1-3 were tested for surface drying time, press drying time, tensile strength, elongation (%), tear strength, aging resistance, gloss loss and drawing adhesion, and the spraying car cover films prepared in Examples 5.1 and 8.1-8.2 were tested for hardness. Test results were shown in Table 1.

The surface drying time and press drying time were tested according to GB/T 1728-1989.

The tensile strength, elongation (%) and tear strength were tested according to GB/T 16777-2008.

The aging resistance was tested according to GB/T 1766-2008.

The drawing adhesion was tested according to GB/T 5210-2006.

The hardness was tested according to GB/T 2739-2006.

TABLE 1

| Item | Surface drying time (min) | Hard drying time (min) | Tensile strength/ MPa | Elongation (%) | Tear strength (N/mm) |
|---|---|---|---|---|---|
| Example 1.1 | 10 | 25 | 20 | 670 | 128 |
| Example 1.2 | 11 | 27 | 20 | 690 | 129 |
| Example 1.3 | 11 | 26 | 24 | 630 | 137 |
| Example 1.4 | 15 | 32 | 28 | 550 | 144 |
| Example 2.1 | 12 | 26 | 19 | 650 | 133 |
| Example 2.2 | 12 | 24 | 22 | 610 | 132 |
| Example 2.3 | 9 | 33 | 21 | 540 | 137 |
| Example 2.4 | 10 | 35 | 34 | 560 | 148 |
| Example 3.1 | 8 | 17 | 20 | 630 | 129 |
| Example 3.2 | 10 | 23 | 20 | 650 | 128 |
| Example 3.3 | 9 | 29 | 21 | 600 | 131 |
| Example 4 | 14 | 28 | 40 | 440 | 205 |
| Example 5.1 | 15 | 35 | 51 | 350 | 230 |
| Example 5.2 | 11 | 25 | 52 | 350 | 233 |
| Example 6.1 | 14 | 27 | 22 | 610 | 130 |
| Example 6.2 | 17 | 33 | 30 | 450 | 182 |
| Example 7.1 | 11 | 23 | 17 | 580 | 126 |
| Example 7.2 | 12 | 25 | 19 | 590 | 133 |
| Example 7.3 | 14 | 29 | 16 | 560 | 130 |
| Example 7.4 | 10 | 24 | 20 | 610 | 135 |
| Example 8.1 | / | / | 47 | 340 | 205 |
| Example 8.2 | / | / | 42 | 330 | 181 |
| Example 9 | / | / | 40 | 300 | 176 |
| Comparative Example 1 | 2 | 5 | 17 | 550 | 128 |
| Comparative Example 2 | 21 | 47 | 14 | 630 | 87 |
| Comparative Example 3 | 7 | 19 | 13 | 710 | 92 |

| Item | QUVA1000h ΔE | Gloss loss (%) | Drawing adhesion | Hardness |
|---|---|---|---|---|
| Example 1.1 | 0.73 | 10 | 4.2 | / |
| Example 1.2 | 0.61 | 11 | 4.5 | / |
| Example 1.3 | 0.62 | 10 | 4.1 | / |
| Example 1.4 | 0.69 | 11 | 5.0 | / |
| Example 2.1 | 0.66 | 12 | 4.7 | / |
| Example 2.2 | 0.57 | 9 | 4.5 | / |
| Example 2.3 | 0.53 | 8 | 4.9 | / |
| Example 2.4 | 0.51 | 8 | 5.0 | / |
| Example 3.1 | 0.62 | 11 | 3.6 | / |
| Example 3.2 | 0.65 | 11 | 4.2 | / |
| Example 3.3 | 0.58 | 10 | 4.6 | / |
| Example 4 | 0.41 | 6 | 3.9 | / |
| Example 5.1 | 0.47 | 6 | 3.6 | F |
| Example 5.2 | 0.59 | 10 | 3.1 | / |
| Example 6.1 | 0.63 | 11 | 4.5 | / |
| Example 6.2 | 0.52 | 9 | 3.7 | / |
| Example 7.1 | 0.69 | 13 | 4.9 | / |
| Example 7.2 | 0.68 | 12 | 4.6 | / |
| Example 7.3 | 0.71 | 12 | 5.0 | / |
| Example 7.4 | 0.61 | 10 | 4.4 | / |
| Example 8.1 | 0.51 | 9 | 3.6 | HF |
| Example 8.2 | 0.51 | 9 | 3.6 | H |
| Example 9 | 0.58 | 10 | 3.6 | / |
| Comparative Example 1 | 15.63 | 62 | 1.7 | / |
| Comparative Example 2 | 0.77 | 13 | 7.1 | / |
| Comparative Example 3 | 0.81 | 11 | 5.0 | / |

Data Analysis:

As can be seen from Table 1, the spraying car cover films prepared in Examples 1-9 of the present application have good strength, elongation, weather resistance and tear strength, can be peeled off as whole, and also have good tear ability and good adhesion to the car paint. However, the car cover film prepared by a reaction of an aromatic amino component and an isocyanate in Comparative Example 1 has high drying speed, low drawing adhesion and poor weather resistance and is prone to peeling off, yellowing and loss of gloss. The car cover film prepared by a reaction of a sterically hindered secondary amine aspartate resin and an isocyanate in Comparative Example 2 has good adhesion, but poor tensile strength, tear strength and other mechanical properties, and is difficultly peeled off as whole.

The examples of the specific embodiments are preferred examples of the present application and do not therefore limit a scope of the present application. Therefore, any equivalent changes made in accordance with a structure, shape and principle of the present application shall be covered by the scope of the present application.

What is claimed is:

1. A spraying liquid car cover film composition, comprising component A and component B, wherein: the component A comprises the following raw materials in parts by weight: 10-40 parts of an isocyanate prepolymer and 1-10 parts of an isocyanate monomer; the component B comprises the following raw materials in parts by weight: 5-20 parts of an imine resin and 0-20 parts of a polyaspartate resin; the isocyanate prepolymer is at least one of an aliphatic isocyanate prepolymer or an alicyclic isocyanate elastic prepolymer; the isocyanate monomer is an alicyclic isocyanate monomer; the imine resin is at least one of an aliphatic imine resin or an alicyclic imine resin; the polyaspartate resin is at least one of an aliphatic polyaspartate resin or an alicyclic polyaspartate resin; and at least one of the isocyanate prepolymer, the imine resin or the polyaspartate resin comprises an alicyclic structure when the component A and the component B are used in combination.

2. The spraying liquid car cover film composition according to claim 1, wherein at least two of the isocyanate prepolymer, the imine resin or the polyaspartate resin comprise the alicyclic structure when the component A and the component B are used in combination.

3. The spraying liquid car cover film composition according to claim 2, wherein all of the isocyanate prepolymer, the imine resin and the polyaspartate resin comprise the alicyclic structure when the component A and the component B are used in combination.

4. The spraying liquid car cover film composition according to claim 1, further comprising at least one of an defoamer agent, a leveling agent, an anti-sag agent, an ultraviolet (UV) absorber, a second catalyst, a second solvent, or a pigment paste.

5. The spraying liquid car cover film composition according to claim 4, wherein the pigment paste is prepared by mixing at least one of the polyaspartate resin or the imine resin, an anti-settling agent, a dispersant, a pigment and a third solvent.

6. A spraying car cover film comprising a protective layer, wherein the protective layer is formed by the spraying liquid car cover film composition according to claim 1 cured on an outer surface of a car paint.

7. The spraying car cover film according to claim 6, wherein a topcoat layer is further provided on an outer surface of the protective layer, and the topcoat layer is an acrylic resin layer or a polyaspartate polyurea layer.

8. The spraying car cover film according to claim 7, wherein a color toning layer is further provided between the protective layer and the topcoat layer, and the color toning layer is at least one selected from a group consisting of a solid-color paint layer, a metallic paint layer and a pearlescent paint layer.

9. A method for preparing the spraying car cover film according to claim 6, comprising the following steps:

S1, dispersing the raw materials of the component A of the spraying liquid car cover film composition at 1000-1500 r/min for 30-40 min to obtain the component A; dispersing the raw materials of the component B of the spraying liquid car cover film composition at 1000-1500 r/min for 30-40 min to obtain the component B; and S2, mixing the component A and the component B at a weight ratio of (1-10):1 to obtain a mixture and spraying the mixture on the outer surface of the car paint to form the protective layer after the mixture is cured, thus obtaining the spraying car cover film.

* * * * *